(12) United States Patent
Barber

(10) Patent No.: US 11,306,702 B2
(45) Date of Patent: *Apr. 19, 2022

(54) TRANSITIONING WIND TURBINE

(71) Applicant: Gerald L. Barber, Greenville, SC (US)

(72) Inventor: Gerald L. Barber, Greenville, SC (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/987,045

(22) Filed: Aug. 6, 2020

(65) Prior Publication Data

US 2020/0362825 A1 Nov. 19, 2020

Related U.S. Application Data

(63) Continuation of application No. 16/059,126, filed on Aug. 9, 2018, now Pat. No. 10,788,016, which is a continuation-in-part of application No. 15/975,004, filed on May 9, 2018, now Pat. No. 10,941,751.

(60) Provisional application No. 62/543,206, filed on Aug. 9, 2017, provisional application No. 62/504,041, filed on May 10, 2017.

(51) Int. Cl.
| | |
|---|---|
| *F03D 13/20* | (2016.01) |
| *F03D 1/06* | (2006.01) |
| *F03D 80/80* | (2016.01) |
| *F03D 9/32* | (2016.01) |
| *F03D 13/25* | (2016.01) |

(52) U.S. Cl.
CPC ............ *F03D 13/20* (2016.05); *F03D 1/0625* (2013.01); *F03D 9/32* (2016.05); *F03D 13/25* (2016.05); *F03D 80/80* (2016.05); *F05B 2220/706* (2013.01); *F05B 2230/6102* (2013.01); *F05B 2240/12* (2013.01); *F05B 2240/912* (2013.01); *F05B 2240/9152* (2013.01); *F05B 2240/93* (2013.01); *F05B 2240/95* (2013.01); *F05B 2260/02* (2013.01)

(58) Field of Classification Search
CPC .................. F05B 2240/78; F05B 2260/33
USPC ................................ 52/745.17, 745.2
See application file for complete search history.

(56) References Cited

U.S. PATENT DOCUMENTS

| | | | | |
|---|---|---|---|---|
| 4,221,088 A | * | 9/1980 | Patterson | ............... E04H 12/34 52/116 |
| 8,134,251 B2 | * | 3/2012 | Barber | .................. F03D 1/0608 290/55 |
| 2010/0264662 A1 | * | 10/2010 | Barber | .................. F03D 7/0224 290/55 |

* cited by examiner

*Primary Examiner* — Igor Kershteyn
*Assistant Examiner* — Jason Fountain
(74) *Attorney, Agent, or Firm* — Kim and Lahey Law Firm, LLC; Seann P. Lahey; Douglas W. Kim

(57) ABSTRACT

A transitioning wind turbine for land or offshore use having a tower base; a wind turbine tower attached to the tower base; a wind turbine attached to the wind turbine tower having a hub and an outer perimeter with spokes disposed between the hub and outer perimeter; a set of vanes carried by the spokes; a generator configured to engage the outer perimeter of the wind turbine and convert a rotational energy of the outer perimeter into power; a lifting tower having a pivot disposed at a proximal end of the lifting tower; a cable attached between the lifting tower and the wind turbine tower; and, wherein the lifting tower is configured to transition from the upright position to the tilted position as the wind turbine tower transitions between the horizontal position to the vertical position.

18 Claims, 14 Drawing Sheets

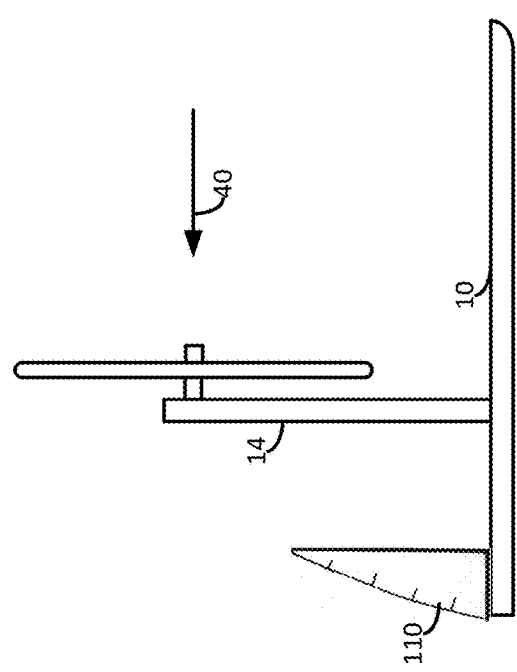
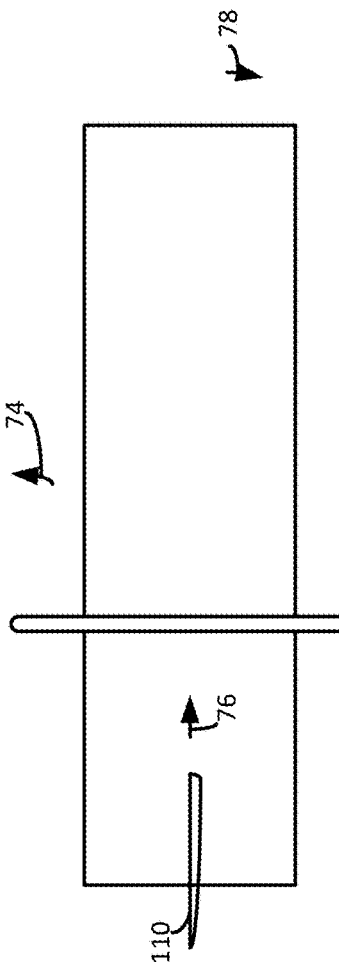
Fig. 17A
Fig. 17B

TRANSITIONING WIND TURBINE

BACKGROUND OF THE INVENTION

1) Field of the Invention

A wind turbine, both land-based and offshore, that can be easily erected from a generally horizontal position for maintenance, safety and transport to a generally vertical position in operation.

2) Description of Related Art

The development of wind-energy in the U.S. has ramped up in recent years, especially with a renewed focus on renewable energy. There has also been increased interest in off shore wind turbines as winds generated over large bodies of water, particularly over an ocean, are not confronted with mountains, buildings, and the vegetation of the land masses that tend to slow the velocity of winds. The turbulence of wind is usually less over water than over land. This may be because there is a greater temperature variance between different altitudes over land than over a body of water, apparently, because sunlight is absorbed further into water than into land, and for comparable conditions, the surfaces of land become warmer and radiates more heat than the surfaces of water. Also, some of the largest cities of the world are positioned adjacent to large bodies of water such as adjacent oceans and seas where wind velocities are not slowed and are less turbulent near the water surface and are more predictable.

Another advantage of the wind turbine placed on bodies of water is that the less turbulent winds at the surface of the water allow the turbine wheel to be supported lower and closer to the surface of the water. This tends to reduce the expense of having a tall tower as usually required for land mounted wind turbines. Accordingly, it would be desirable to locate wind turbines on bodies of water spaced relatively close to a land mass where there is a need for electricity. Also, it would be desirable to produce wind turbines with a means for reducing the longitudinal force applied by the turbine wheel to the tower or other vertical support of the wind turbine.

According to one study, however, offshore wind turbines built according to traditional standards used for land-based systems and using designs may not be able to withstand the gusts of a category 5 hurricane and thereby pose a risk of personal and property damage. Further, the potential damage to the wind turbine from one storm can dramatically reduce the financial viability of an offshore project. Further, current designs do not handle veer which is the measure of the change of wind across a vertical span. The strain on the blades can be too great creating damage to the blades and hub.

One study predicts that offshore turbines will face hurricane wind gusts in excess of 223 miles per hour but can only withstand gusts of 156 miles per hour. The problem seems to stem from the fact that offshore turbine designs find its origin in Europe, where hurricane conditions are essentially nonexistent. While the land-based system may not face these wind forces, it would be advantage to have a wind turbine system that could be lowered in the event of these damaging winds or storms.

Accordingly, it would be beneficial to have a wind turbine that could be placed in a generally horizontal position with fairly little effort when a damaging wind or storms are anticipated.

An additional issue with wind turbine using conventional designs is that maintenance of the wind turbine is challenging. Over the lifetime of a wind turbine, it is inevitable that large components, including rotor blades, generators, transformers, and gearboxes, will need to be repaired or replaced through wear or damage. With some designs, these components are over one hundred (100) feet in the air. The problems are magnified when the wind turbine is offshore, and the components are one hundred feet over the ocean and must be accessed through floating barges, cranes, or other watercraft. In some cases of offshore installations, the components are removed from the offshore locations, transported to land, repaired, transported back to the offshore location and installed, utilizing a crane to reach the highest components.

It would be advantageous to have a wind turbine design that is capable of being lowered for transportation and repair. It would also be advantageous to have a wind turbine where the components can be repaired without having to transport the turbine or components to land.

One effect of having a rotating wind turbine is that there is a gyroscopic effect resulting from the rotation energy. This can, among other factors, create horizontal deflection so that the wind turbine will rotate away from an optimal angle of attack. There have been attempts to reduce or eliminate these forces keeping a wind turbine facing into the wind without hub and gearbox stresses. The concepts include controlling the pitch of individual blades, to decreasing gyroscopic forces on the rotor when yawing. This concept presumes to take advantage of the wind's kinetic energy on the blade to assist in turning the turbine into the wind. Such a control feature cyclically alters blade pitch as the wind direction changes so as to present different angles of attack between the blades and wind. This concept may also eliminate the need for yaw drive motors. Experiments with this concept have been conducted on a small scale but continued research and investments are needed before this technology reaches large-scale wind turbines.

These disadvantages are especially troublesome with offshore wind turbines. Therefore, it would be advantageous to have an offshore wind turbine that can counter the gyroscopic effects of the wind turbine without resorting to thrusters, or other powered means which necessarily draw power from the system reducing its overall output. With these powered attempts, power from the wind turbine is diverted to thrusters and cannot be delivered to the power grid or other locations.

Therefore, it would be advantageous to have an offshore wind turbine that can be easily erected and lowered and does not rely upon powered means to maintain a proper angle of attack between the wind turbine and the wind direction.

BRIEF SUMMARY OF THE INVENTION

The above can be accomplished by providing a transitioning wind turbine comprising: a wind turbine, that can be placed on a barge or land, having a tower base; a wind turbine tower hingeably attached to the tower base having a horizontal position and a vertical position; a wind turbine attached to the wind turbine tower having a hub and an outer perimeter with spokes disposed between the hub and outer perimeter; a set of vanes carried by the spokes configured to rotate the outer perimeter in response to the movement of atmospheric wind; a generator configured to engage the outer perimeter of the wind turbine and convert a rotational energy of the outer perimeter into power; a lifting tower having a pivot disposed at a proximal end of the lifting tower and having an upright position and a tilted position; a cable attached between the lifting tower and the wind turbine tower; and, wherein the lifting tower is configured to transition from the upright position to the tilted position as the wind turbine tower transitions between the horizontal position to the vertical position and a cable length between a lifting tower proximal end and the wind turbine tower is shortened.

The transitioning wind turbine can include an installation barge removable attachable to the wind turbine barge and configured to support the lifting tower. A support standard can be attached to the installation barge or wind turbine barge to support the wind turbine tower in the horizontal position. A lifting assembly can be disposed at the proximal end of the lifting tower and connected to the cable. A first distance can be included between the pivot of the lifting tower and the tower base when the wind turbine tower is in the horizontal position and a second distance included between the pivot of the lifting tower and the tower base when the wind turbine tower is in the vertical position, wherein the first distance is shorter than the second distance. Fastening means can be used to secure the wind turbine tower to the tower base when the wind turbine tower is in the vertical position. The lifting tower can include a transportation position wherein the lifting tower is tilted forward relative to the tower base.

A wind turbine tower can be hingeably attached to the wind turbine base and having a horizontal position and a vertical position. The wind turbine base can be land based or offshore. A wind turbine can be attached to the wind turbine tower; a lifting tower connected to the wind turbine tower and having an upright position and a tilted position; and, wherein the lifting tower is configured to transition from the upright position to the tilted position as the wind turbine tower transitions between the horizontal position to the vertical position. The lifting tower can also transition forward relative to the base to be generally parallel to the wind turbine tower when the wind turbine tower is in the horizontal position.

BRIEF DESCRIPTION OF THE DRAWINGS

The following description of the wind turbine will be better understood by reference to the following drawings that are incorporated and made part of the written specification:

FIG. 17A is a side view of aspects of barge including the air foil carried by the barge;

FIG. 17B is a top view of aspects of the barge including the air foil carried by the barge; and, FIGS. 18A through 18D are perspective views of aspects of the wind turbine and other components.

DETAILED DESCRIPTION OF THE INVENTION

The wind turbine and related components are now described more fully herein with reference to the drawings in which some embodiments of are shown. This invention may, however, be embodied in many different forms and should not be construed as limited to the embodiments set forth herein. Rather, these embodiments are provided so that this disclosure will be thorough and complete and will fully convey the scope of the invention to those skilled in the art.

Figure 1:
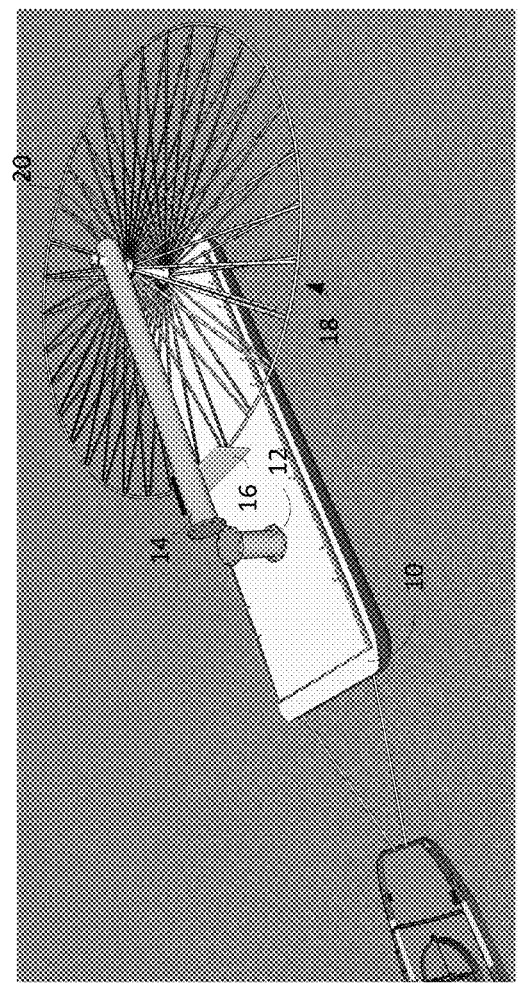
FIGS. 1 through 8 are perspective views of various aspects of the wind turbine in the horizontal and vertical positions.

Referring to FIG. 1, a wind turbine barge 10 can include a tower base 12 that can be hingeably attached to a tower tube 14 or lattice tower or other structure. The tower tube can support a generator platform 16 configured to support a generator and a turbine wheel 18. When in the horizontal position, the tower tube hub can be supported by the barge at the distal end 20 of the tower tube. In one embodiment, an installation barge can be used to transport the wind turbine to its offshore location. The tower, in its horizontal position, can extends beyond the wind turbine barge and be supported by the installation barge.

Figure 2:
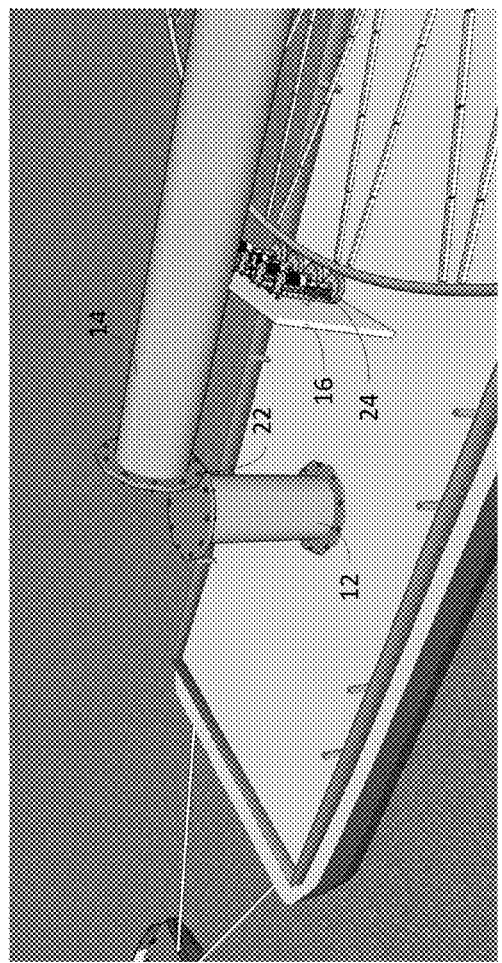

Referring to FIG. 2, the tower tube 14 can be attached to the tower base 12 with tower hinge 22. In one embodiment, the hinge can be placed inward in relation to the wind turbine barge as shown so that the tower extends over the wind turbine barge in the horizontal position. In one embodiment, the hinge can be placed outward in relation so the wind turbine barge so that the tower extends beyond the perimeter of the wind turbine barge in the horizontal position and can be supported by a installation barge. One or more generators 24 can be attached to the generator platform 16. The generator platform can be placed on the inward to outward side of the tower.

Figure 3:
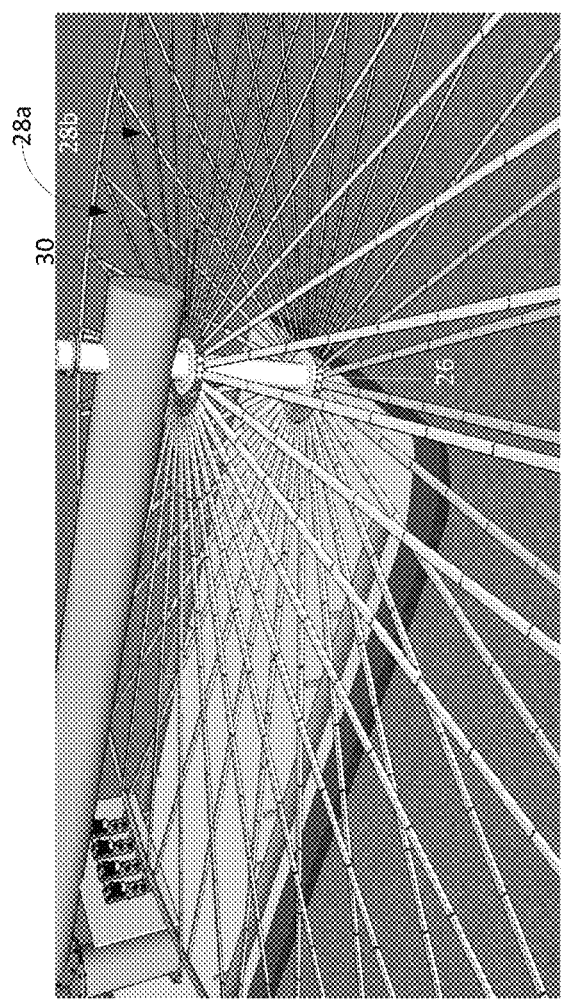
Figure 4:
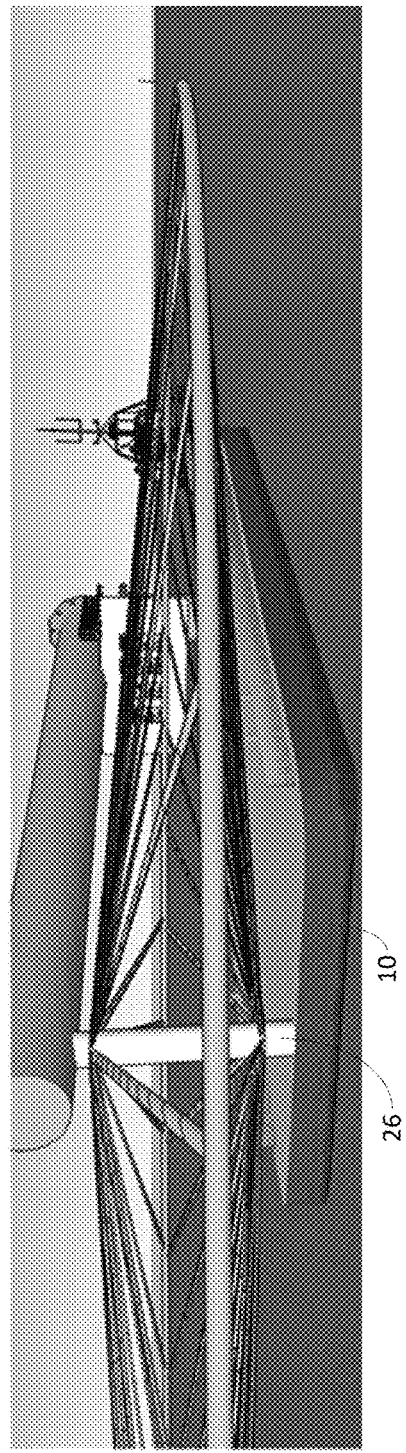
Figure 5:
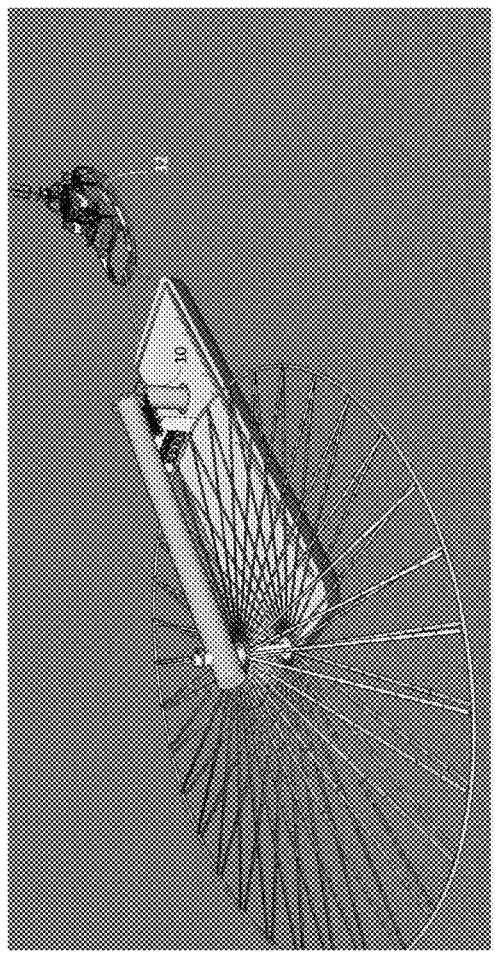
Figure 15B:
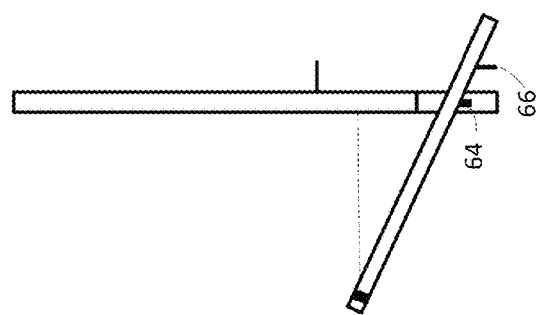
FIGS. 15A through 15F are side views of aspects of the lifting assembly.
Figure 15C:
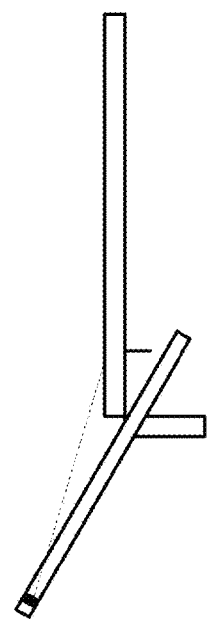
Figure 15A:
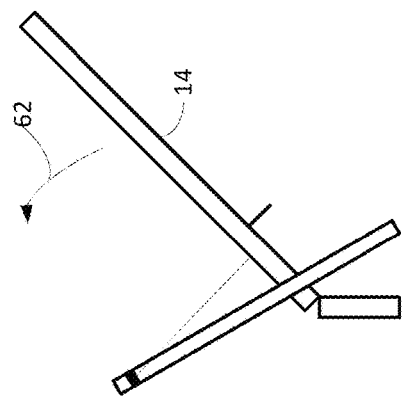

Referring to FIGS. 3 through 5, the turbine wheel can include an axle 26 with an inner set of spokes 28a and an outer set of spokes 28b. The inner and outer set of spokes are attached to the hub and to an outer perimeter 30. In the horizontal position, the various components of the turbine wheel can be accessed for construction, repair or replacement. Further, the horizontal position allows the turbine wheel to be lowered in the event of damaging weather. The axle 26 can rest against the wind turbine barge 10 when in the horizontal position. Further, the barge can be transported, such as by ship 32, when in the horizontal position. The tower can also be supported by a standard 100 (FIG. 15A) so that the axle can extend over the perimeter of the barge, in one embodiment, when in the horizontal position.

Figure 6:
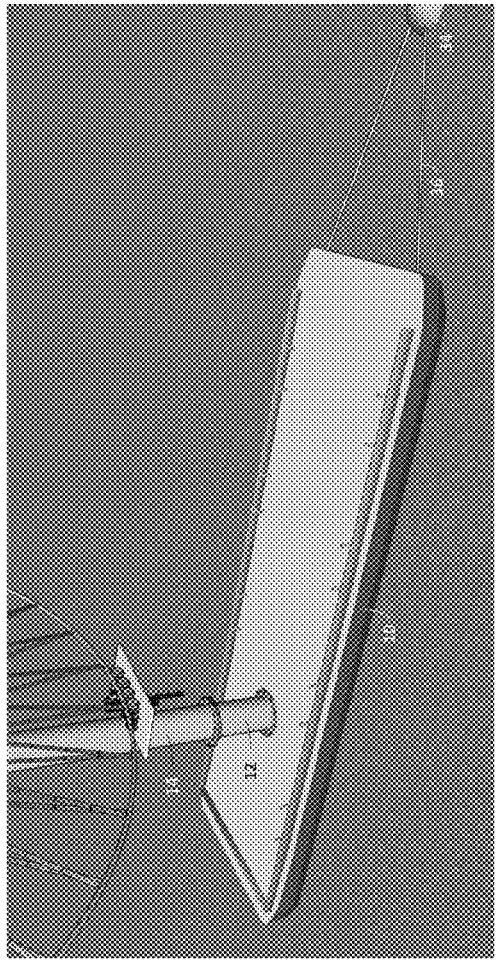
Figure 7:
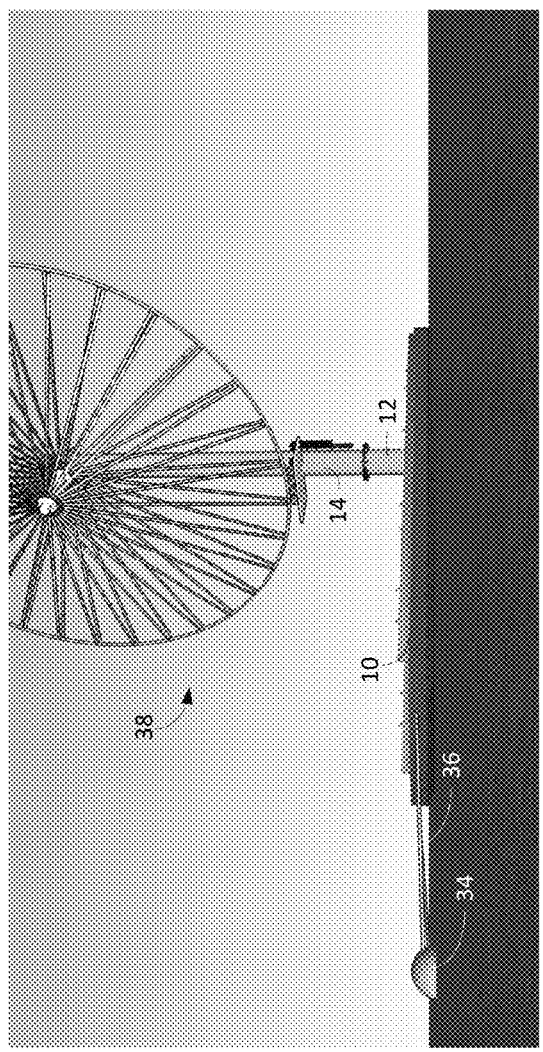
Figure 8:
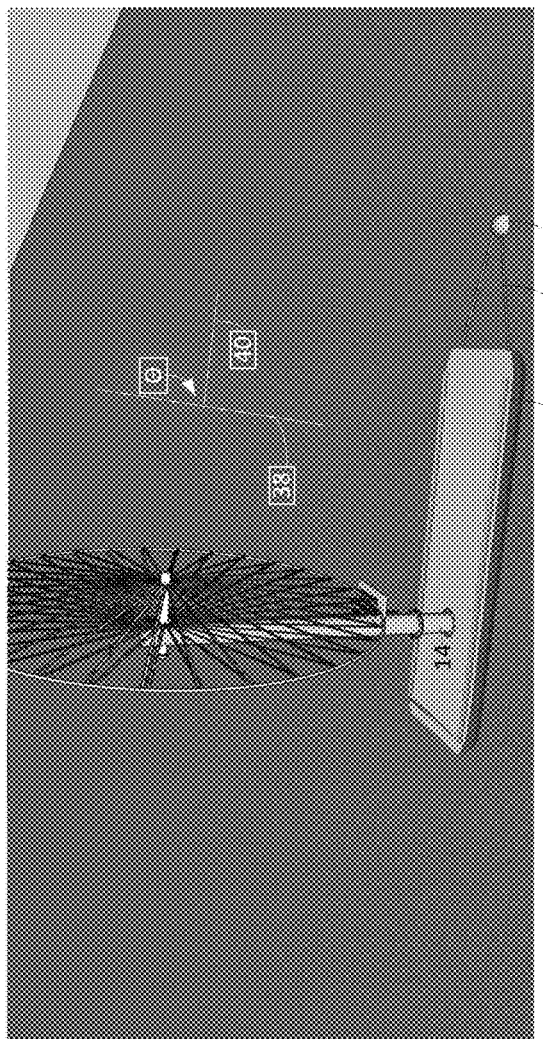
Figure 9:
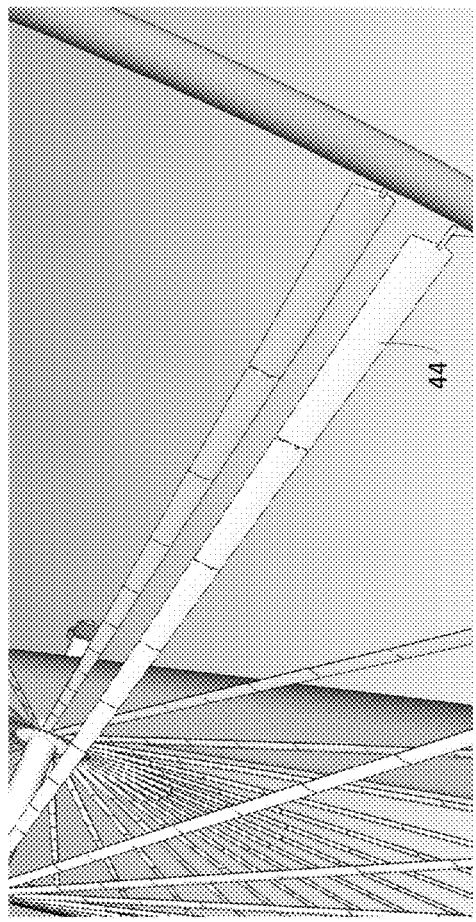
FIGS. 9 through 12 are perspective views of various aspects of the wind turbine including the vanes carried by the spokes.
Figure 10:
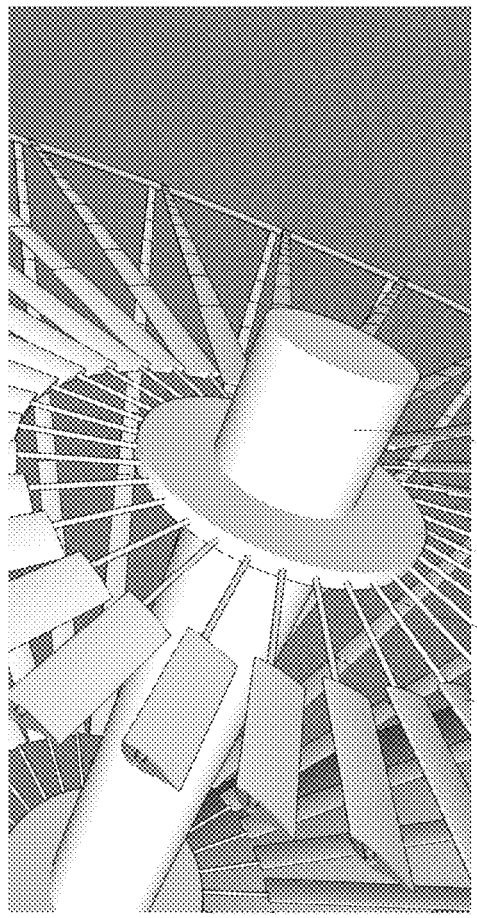
Figure 11:
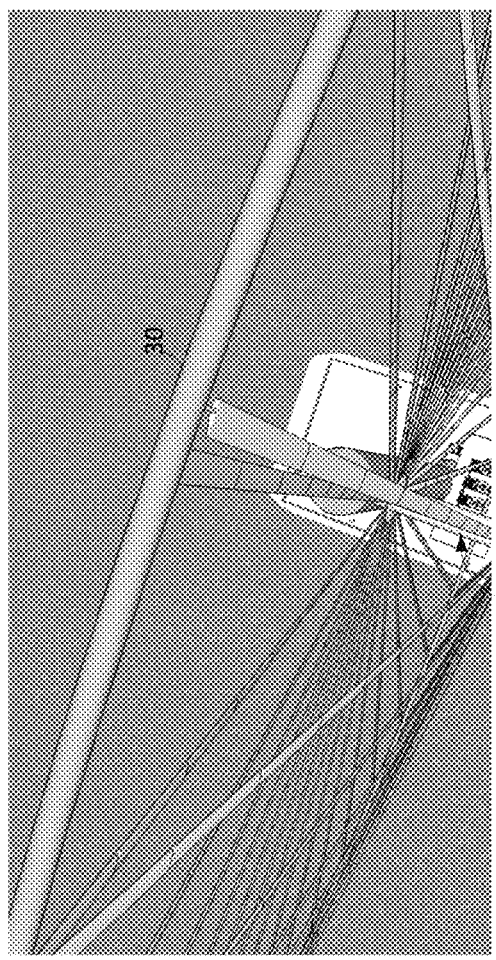
Figure 12:
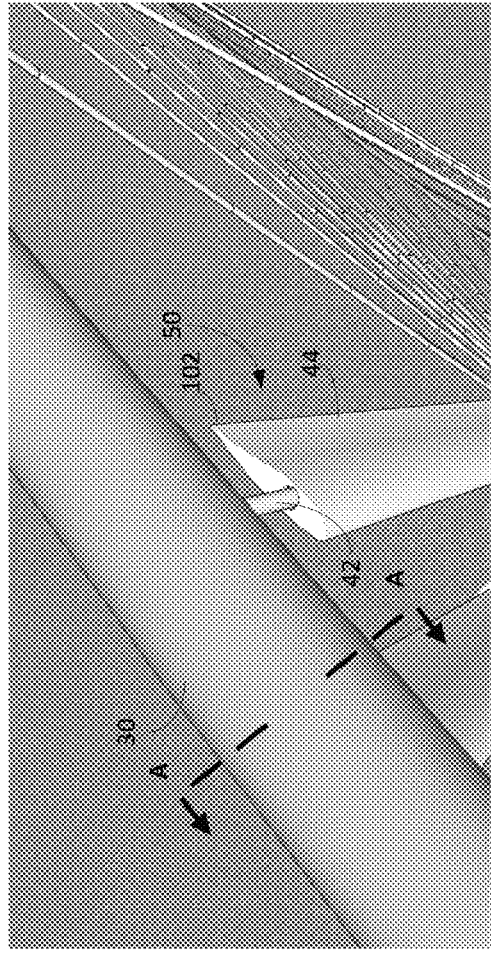

Referring to FIGS. 6 through 8, the tower tube 14 is shown in the erected position and secured to the tower base 12. When erected, the wind turbine barge 10 can be connected to a buoy 34 with lines 36. In one embodiment, the buoy is anchored to the seafloor. The lines allow the barge to rotate about the buoy so that the wind direction is into the wind turbine to assist with the proper angle of attack Θ of the wind direction 40 relative to the plane 38 of the wind turbine wheel. The angle of attack is about 90° in one embodiment.

Referring to FIGS. 9 through 12, there can be a set of vanes included in the wind turbine. Each spoke 42 can carry a sub-set of vanes. The sub-set of vanes can include a distal vane 44 that is disposed adjacent to the perimeter. Each vane can have a general wing shape 50. The sub set of vanes, having one or more vanes, can be disposed along the spoke to generally cover the entire spoke. The vanes can independently rotating relative to each other along their spoke and are cooperatively associated to have different angles of attack relative to the oncoming wind to account for the different wind speeds along the spoke. The vanes can include an upturned portion 102 at the trailing edge of the vane. The set of vanes can provide a similar benefit previously provided with blade twist 46 of conventional blades without the need for long blades. The spokes can be attached to a hub flange 48 that rotates about the axle. The outer perimeter 30 can have a circular or oval cross section along AA, in one embodiment.

Figure 13:
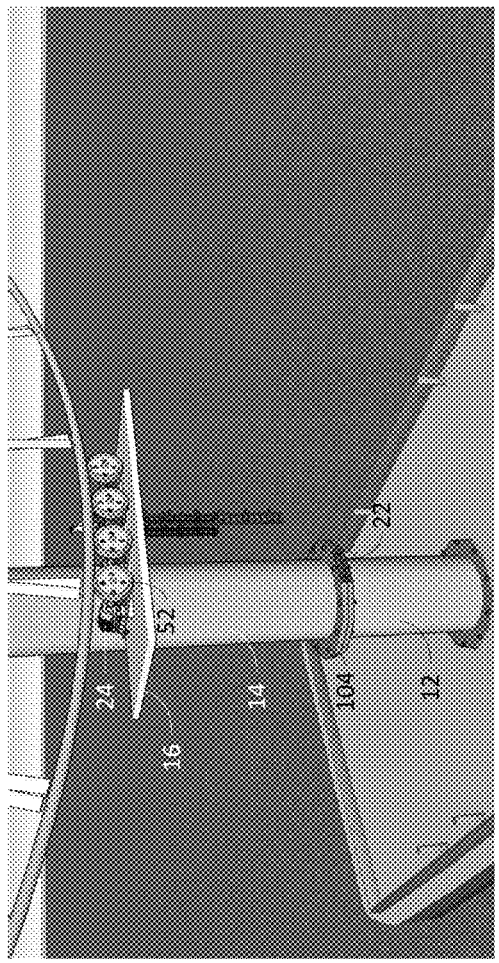
FIGS. 13 and 14 are perspective views of aspects of the wind turbine including the generator and generator platform carried by the tower.
Figure 14:
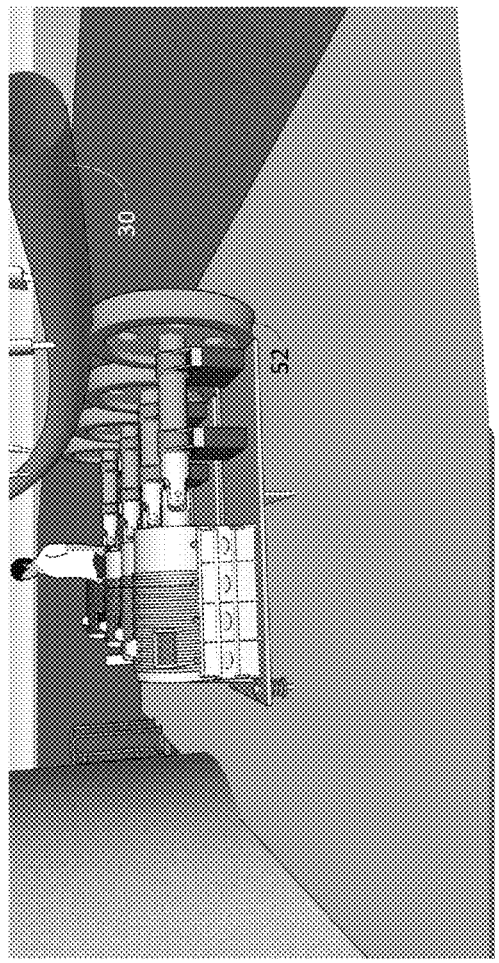

Referring to FIGS. 13 and 14, the tower tube is shown in the erected position with the tower tube affixed to the tower base. The generator platform can support one or more generators 24. The generators can include a generator wheel 52 that can engage with the outer perimeter 30 so that when the outer perimeter rotates, the generator wheel rotates causing the generator to provide power such as electricity. In one embodiment, the generator wheel can have a concave outer surface that can engage with the outer perimeter having a circular or oval cross section. Fastening means 104 can be used to secure the tower to the tower base. Fastening means can include bolts, nuts, welds, screws, latches, snaps, clamps, rivets, and the like.

Referring to FIGS. 15A through 15F, the tower tube 14 can be hingeably attached to the tower base 12. One or more lifting towers 54 can be pivotally attached to the barge at pivot 56. A cable 58 can be attached to a winch, block and tackle or other lifting assembly 60 that can be attached to the distal end of the one or more lifting towers. The cable can be attached at or near the generator platform 16. When the lifting assembly retracts the cable, the tower tube is pulled in a direction 62 and the lifting towers transition rearward. In one embodiment, the cable stays generally perpendicular to the tower tube when the tower tube is being raised. When the tower is in the erected position for operations, the lifting tubes rest on a stop 64 that can be attached to the tower base or otherwise carried by the barge (as shown by 66) to prevent the lifting tubes from over rotating.

Figure 15D:
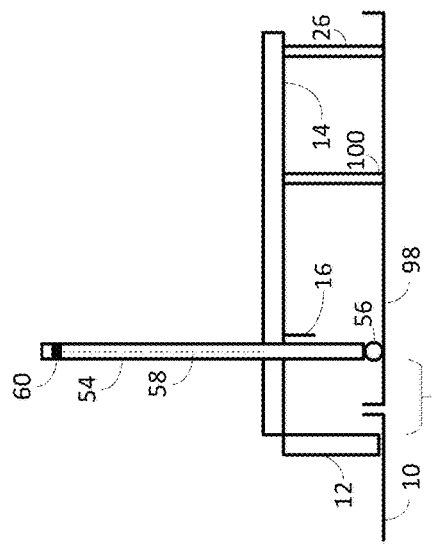
Figure 15E:
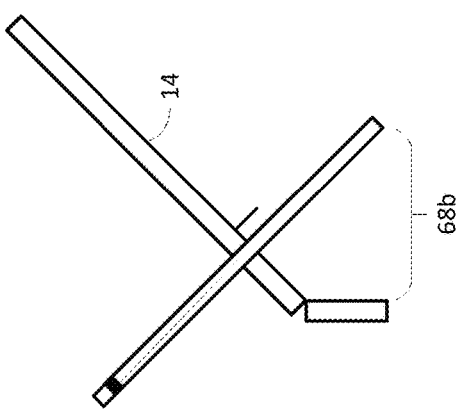
Figure 15F:
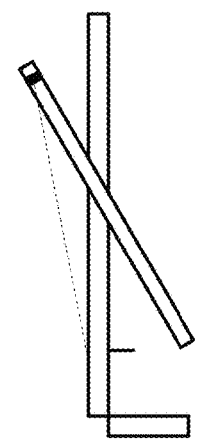
Figure 16A:
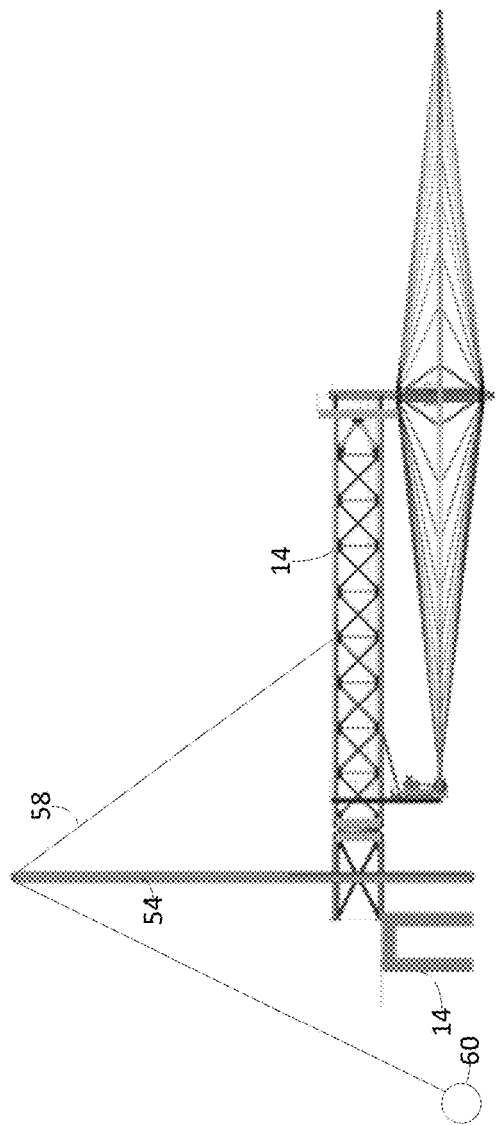
FIGS. 16A through 16D are side views of aspects of the lifting assembly.
Figure 16B:
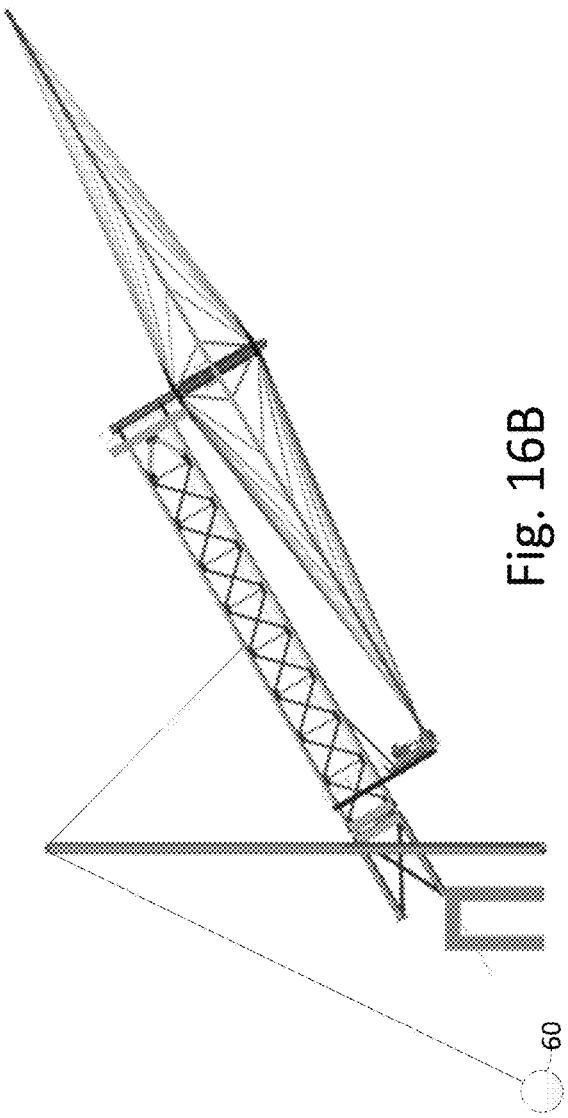
Figure 16C:
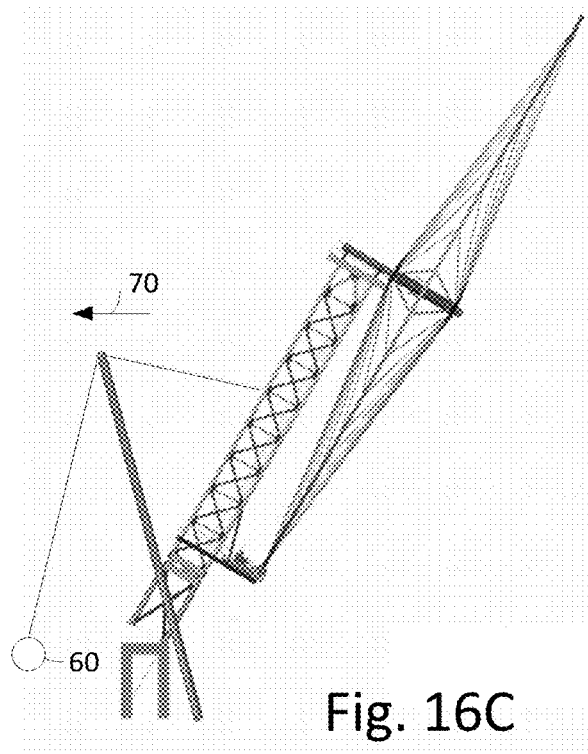
Figure 16D:
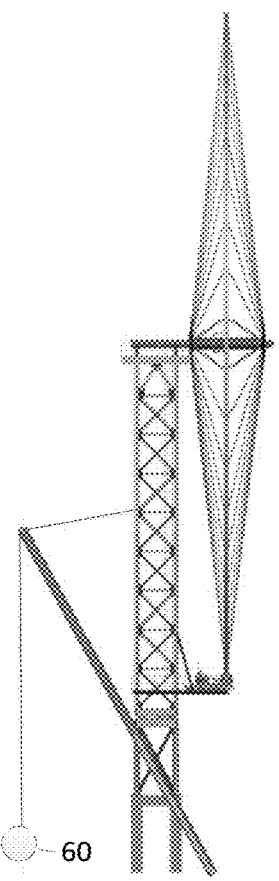
Figure 16E:
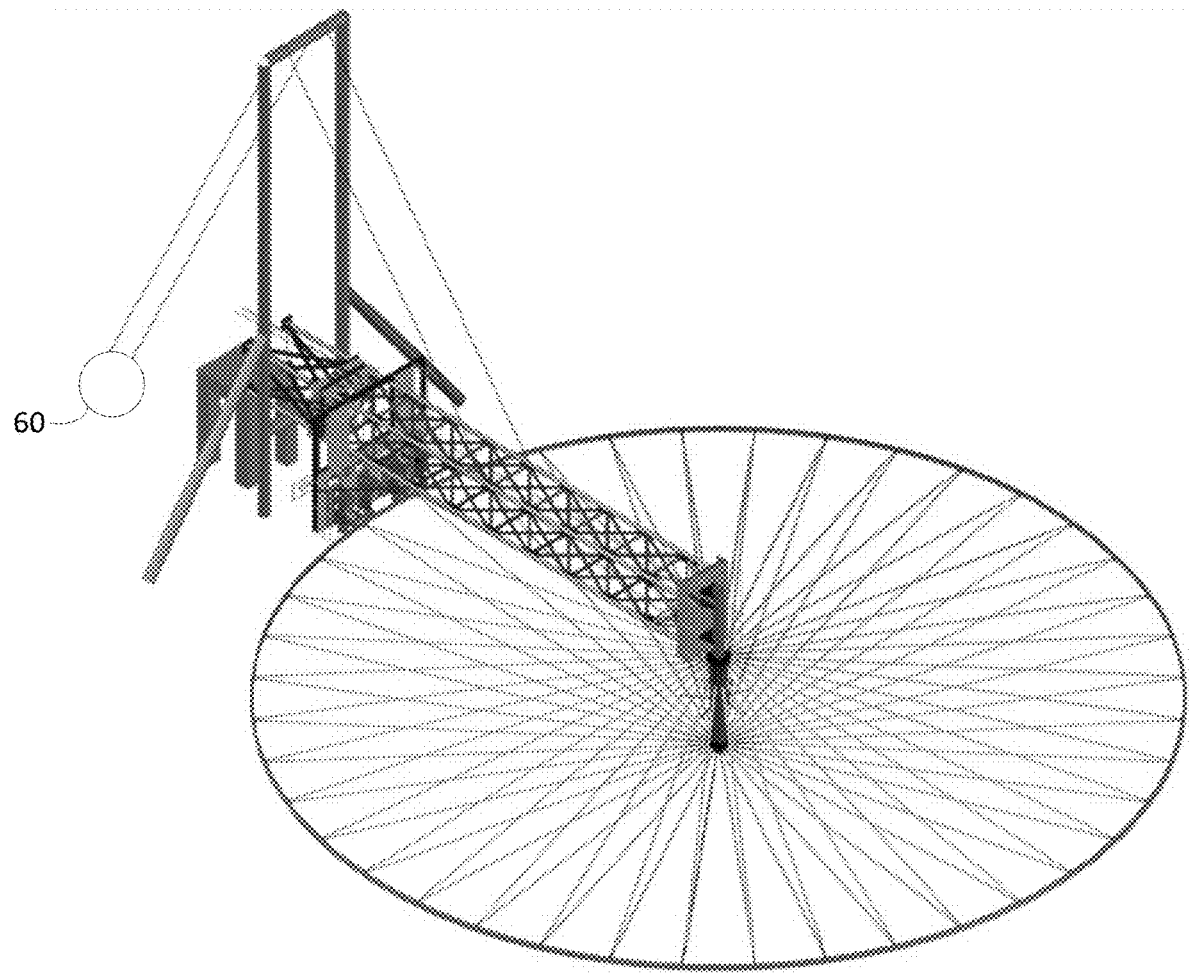
FIG. 16E is a perspective view of aspects of the assembly including the lifting assembly.

When the tower tube is in the horizontal position, the cable can be let-out enough to allow the lifting tubes to be positioned forward for transportation so that the tower tube and lifting tubes are generally in a horizontal configuration as shown in FIG. 15D. In one embodiment, the lifting tower can slide along the barge so that the cable is maintained generally perpendicular to the tower tube during the lifting of the tower tube. The distance between the tower base, or a wind turbine attachment point, and the lifting tube can increase as the tower tube is raised as shown by 68a (horizontal tower tube) and 68b (raised tower tube). The attachment point can be where the wind turbine tower attaches to the barge or a land-based foundation, the tower base or other support.

In one embodiment, the pivot of the lifting tubes maintains the cable generally perpendicular to the tower tube. The top of the lifting tubes can be constantly moving when the tower tube is being raised so that they are moving toward the tower tube. The cable(s) between the lifting tubes and the tower tube stay perpendicular between the tower tube and the lifting assembly as the lifting tubes move at an angle to the tower tube. Once the tower tube is raised, the lifting tubes, and cables, can stay in place. The tower tube can then be bolted to the tower base. To lower the tower tube, the weight of the tower tube and wind turbine will start the lowering process to the barge where the lifting tubes will be generally vertical and the tower tube generally horizontal.

The lifting tubes can then be placed rearwards until they reach about 20° to 30° in one embodiment. The lifting tubes can rest on stops that are attached to the tower base or otherwise carried by the barge.

Referring to FIGS. 16A through 16E, one embodiment of a lifting system is shown. The wind turbine tower 14 is hingeably attached to the tower base 12. The lifting tower 54 can be pivotally attached to the barge and have cables 58 attached to the tower such as with ah pulley between the cable and the top of the lifting tube. A lifting assembly 60 can cause the cable to retract. As the cable retracts, the tower is lifted toward a vertical direction. The lifting tubes can rotate rearwards in a direction 70.

The lifting tubes can be hinged to the barge deck where they can be located on each side of the wind turbine tube about 40 feet, in one embodiment, from where the main tube hinges (standing vertical just below the generator platform when the wind turbine is laid down). The cable can travel down to the tower tube so that when the wind turbine is raised, the cable is perpendicular to the tower tube. The lifting tubes can include a block and tackle that extend out past the tower tube and can be disposed at an angle so that when the wind turbine is in the horizontal position, the lifting tubes are vertical. When the cable is let out, the lifting tubes can rotate toward the stern of the barge until they are in a shipping position.

Figure 18A:
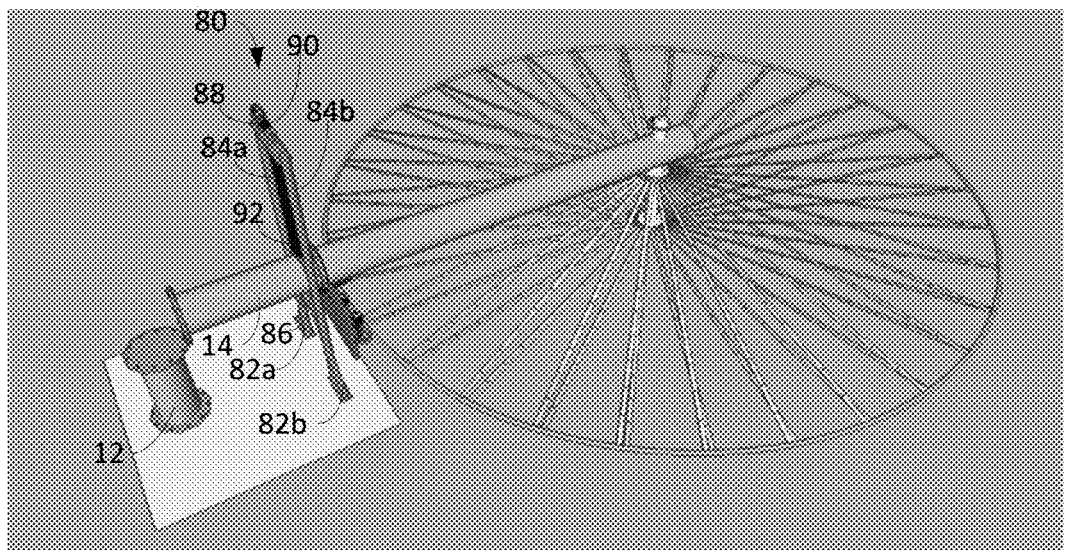
Figure 18B:
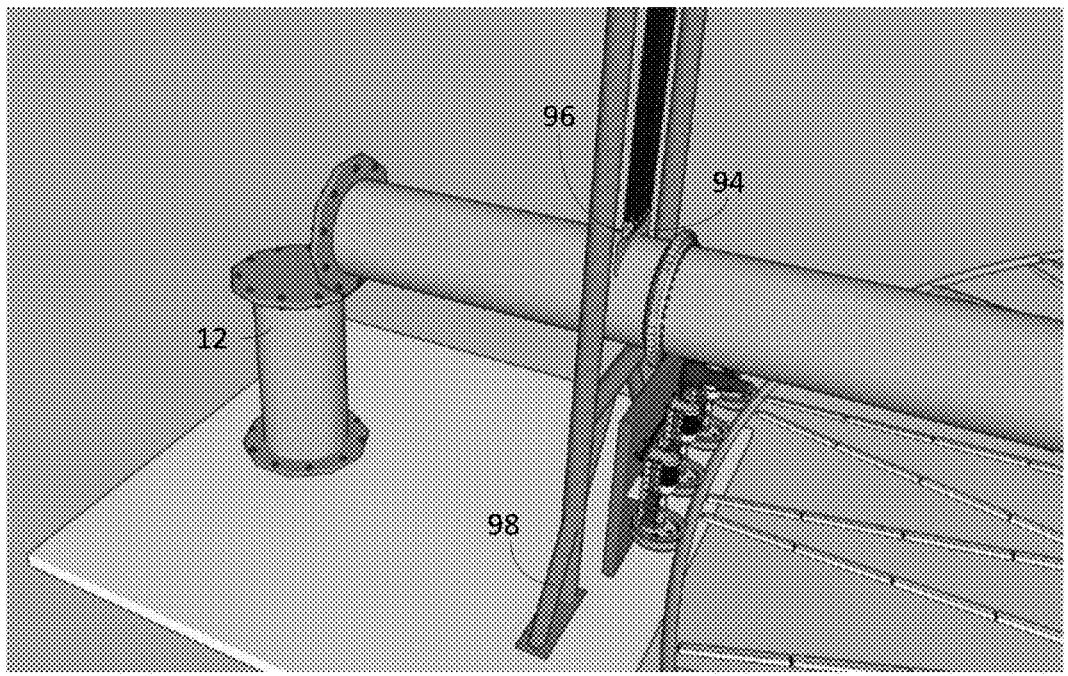
Figure 18C:
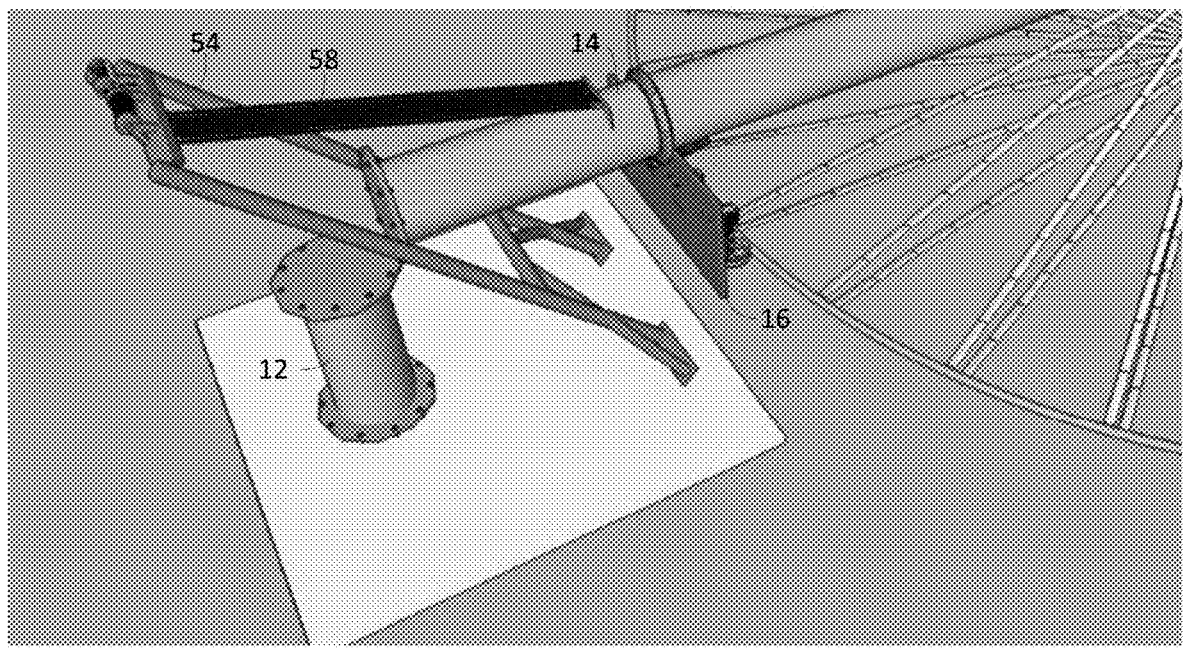
Figure 18D:
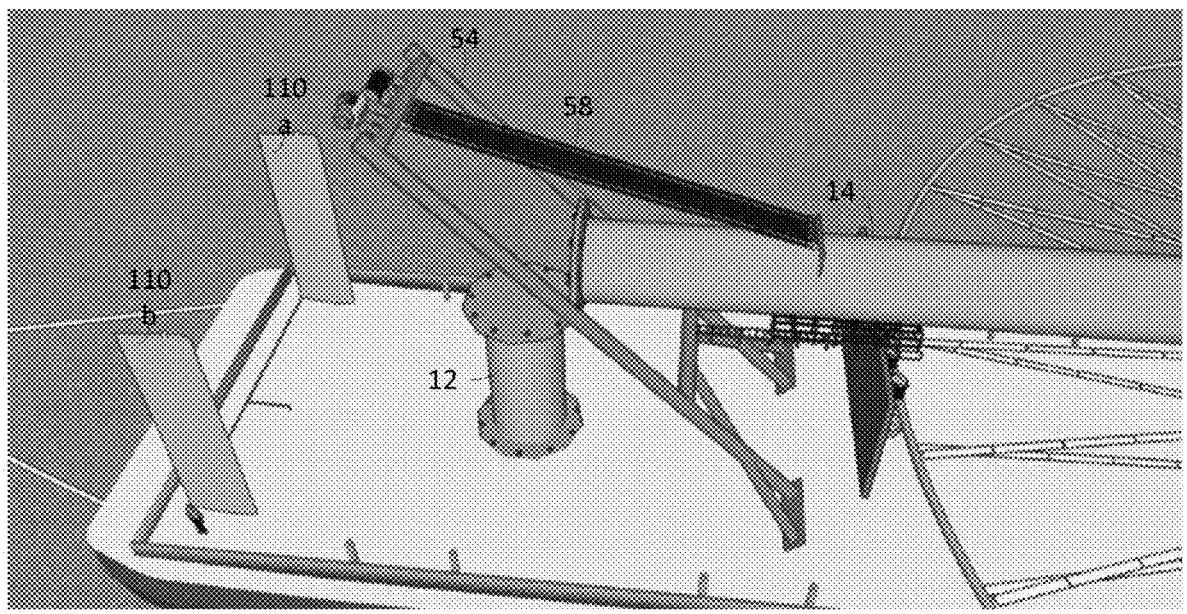

Referring to FIGS. 17A and 17B, one embodiment is shown with an air foil 72 attached to the stern of the barge. When the wind turbine rotates, the gyroscopic effect tends to rotate the wind turbine out of the optimal angle of attack in relationship to the wind direction 40. Placing the air foil on the stern provides for the air foil to bias the barge in the opposite direction of the rotation caused by gyroscopic effect without the need for thrusters. When the gyroscopic force tends to rotate the barge and wind turbine in a direction shown as 74, the wind also biases the air foil 110 to be positioned in line with the wind along path 76 which in turn tends to move the barge in a direction 78 thereby counteracting the gyroscopic effect. Referring to FIGS. 18A and 18C, the wind turbine can be land-based. Referring to FIG. 18D, the offshore wind turbine can include a pair of air foils 110a and 110b carried by the barge.

The design of the assembly has multiple benefits and features including: removal of the conventional gearbox, removal of the conventional yaw bearing, removal of the conventional electrical slip rings, removal of the conventional large single length blades and thus reducing blade fatigue, simple blade/vane replacement, removal of the blade pitch system, the ability to mount the wind turbine on the barge without an ocean floor support structure, simple barge anchoring system, no specialized setup ships, the ability to conduct assembly on land or at docks, the ability to assemble in a horizontal position, the ability to perform maintenance at dock, the provide hurricane avoidance which can reduce insurance costs, removal of oil, eliminating the risk of oil burning/fires, removal of fiberglass nacelle that can also burn, simplistic raising and lowering of the wind turbine, reduction of the detrimental effects of wheel/rim inertia, increase in the diameter of the wind turbine wheel due to use of a set of vanes, removal of stern thrusters, can be located relative close to reverse osmosis equipment, and the placement of electrical equipment below deck. With the elimination of the top most expensive and most complicated components (e.g. gearbox, yaw drive, blade pitch system, electrical slip rings, large blades, sea floor structure, setup ships) the ongoing maintenance will be a fraction of the effort, complexity and costs of conventional offshore wind turbine systems.

It will be understood by those skilled in the art that while the foregoing description sets forth in detail, preferred embodiments of the present assembly, modifications, additions, and changes might be made thereto without departing from the spirit and scope of the assembly, as set forth in the following claims.

What is claimed is:

1. A transitioning wind turbine comprising:
   a wind turbine tower hingeably attached to a tower base, wherein the wind turbine tower is movable between a horizontal position and a vertical position;
   a wind turbine attached to the wind turbine tower, wherein the wind turbine has a hub and an outer perimeter with spokes disposed between the hub and the outer perimeter;
   a set of vanes carried by the spokes configured to rotate the outer perimeter in response to movement of atmospheric wind;
   a generator configured to engage the outer perimeter of the wind turbine and convert a rotational energy of the outer perimeter into power;
   a lifting tower having a pivot disposed at a proximal end of the lifting tower and having an upright position and a tilted position;
   a cable attached between the lifting tower and the wind turbine tower; and,
   wherein the lifting tower is configured to transition from the upright position to the tilted position as the wind turbine tower transitions between the horizontal position to the vertical position and a cable length between the lifting tower and the wind turbine tower is shortened.

2. The transitioning wind turbine of claim 1 including a wind turbine barge supporting the tower base, and an installation barge removably attachable to the wind turbine barge configured to support the lifting tower.

3. The transitioning wind turbine of claim 2 including a standard attached to the installation barge to support the wind turbine tower in the horizontal position.

4. The transitioning wind turbine of claim 1 including a lifting assembly carried by the lifting tower and connected to the cable.

5. The transitioning wind turbine of claim 1 including a first distance between the pivot of the lifting tower and the tower base when the wind turbine tower is in the horizontal position and a second distance between the pivot of the lifting tower and the tower base when the wind turbine tower is in the vertical position, wherein the first distance is shorter than the second distance.

6. The transitioning wind turbine of claim 1 including a wind turbine barge supporting the tower base, and a standard attached to the wind turbine barge to support the wind turbine tower in the horizontal position.

7. The transitioning wind turbine of claim 1 including a fastener to secure the wind turbine tower to the tower base when the wind turbine tower is in the vertical position.

8. The transitioning wind turbine of claim 1 wherein the lifting tower includes a transportation position wherein the lifting tower is tilted forward relative to the tower base.

9. A transitioning wind turbine comprising:
   a wind turbine tower hingeably attached to a tower base for moving between a horizontal position and a vertical position;
   a lifting tower having a pivot disposed at a lifting tower proximal end and having an upright position and a tilted position;
   a cable attached between the lifting tower and the wind turbine tower; and,
   wherein the lifting tower is configured to transition from the upright position to the tilted position as the wind turbine tower transitions between the horizontal position to the vertical position and a cable length between the lifting tower and the wind turbine tower is shortened.

10. The transitioning wind turbine of claim 9 including a lifting assembly disposed at the lifting tower proximal end and connected to the cable.

11. The transitioning wind turbine of claim 9 including a fastener to secure the wind turbine tower to the tower base when the wind turbine tower is in the vertical position.

12. The transitioning wind turbine of claim 9 including a wind turbine carried by the wind turbine tower.

13. The transitioning wind turbine of claim 12 including a set of vanes carried by the wind turbine configured to rotate the wind turbine in response to movement of atmospheric wind.

14. The transitioning wind turbine of claim 13 including a generator configured to engage the wind turbine and convert a rotational energy of the wind turbine into power.

15. A transitioning wind turbine comprising:
   a wind turbine tower hingeably attached to a wind turbine base, wherein the wind turbine tower is movable between a horizontal position and a vertical position;
   a wind turbine attached to the wind turbine tower; and,
   a lifting tower connected to the wind turbine tower by a cable, wherein the lifting tower is movable between an upright position and a tilted position;
   wherein the lifting tower is configured to transition from the upright position to the tilted position as the wind turbine tower transitions between the horizontal position to the vertical position, and wherein the cable stays perpendicular to the wind turbine tower between the lifting tower and the wind turbine tower during movement between the horizontal and vertical positions; and,
   a first distance between a pivot of the lifting tower and an attachment point when the wind turbine tower is in the horizontal position and a second distance between the pivot of the lifting tower and the attachment point when the wind turbine tower is in the vertical position, wherein the first distance is shorter than the second distance.

16. The transitioning wind turbine of claim 15 including a pivot disposed at a proximal end of the lifting tower.

17. The transitioning wind turbine of claim 15 including a floatable barge supporting the wind turbine base.

18. The transitioning wind turbine of claim 17 including an air foil carried by the floatable barge.

* * * * *